June 19, 1956  R. M. LUNCEFORD  2,750,793
RADIATOR TESTING DEVICE
Filed March 12, 1953  2 Sheets-Sheet 1

Raymond M. Lunceford
INVENTOR.

June 19, 1956  R. M. LUNCEFORD  2,750,793
RADIATOR TESTING DEVICE
Filed March 12, 1953  2 Sheets-Sheet 2

Raymond M. Lunceford
INVENTOR.

United States Patent Office 2,750,793
Patented June 19, 1956

2,750,793
RADIATOR TESTING DEVICE
Raymond M. Lunceford, Wills Point, Tex.

Application March 12, 1953, Serial No. 341,970

2 Claims. (Cl. 73—45.8)

This invention relates to an automotive vehicle radiator testing device and has for its particular object the provision of means for supporting and adjustably positioning a vehicle radiator in a body of fluid in a manner so as to simplify the testing and repair thereof.

Another important object of the invention is to provide means for raising and lowering a radiator supporting tray, the water pressure supplied at a tap at the location at which this testing device is installed being employed.

The construction of this invention features the use of a hydraulically operated piston which is rigidly attached to a supporting cylinder, the cylinder having means associated therewith for lockingly adjustably holding a rod in a preset position, the rod having rotatably attached thereto a tray for supporting the radiator within a vat.

Still further objects of this invention reside in the provision of a radiator testing device that is highly efficient in operation, simple in construction and manufacture, strong and durable, and capable of being used in the repair and testing of automotive vehicle radiators.

These, together with the various ancillary objects and features of the invention which will become apparent as the following description proceeds, are attained by this radiator testing device, a preferred embodiment of which has been illustrated in the accompanying drawings, by way of example only, wherein.

Figure 1:
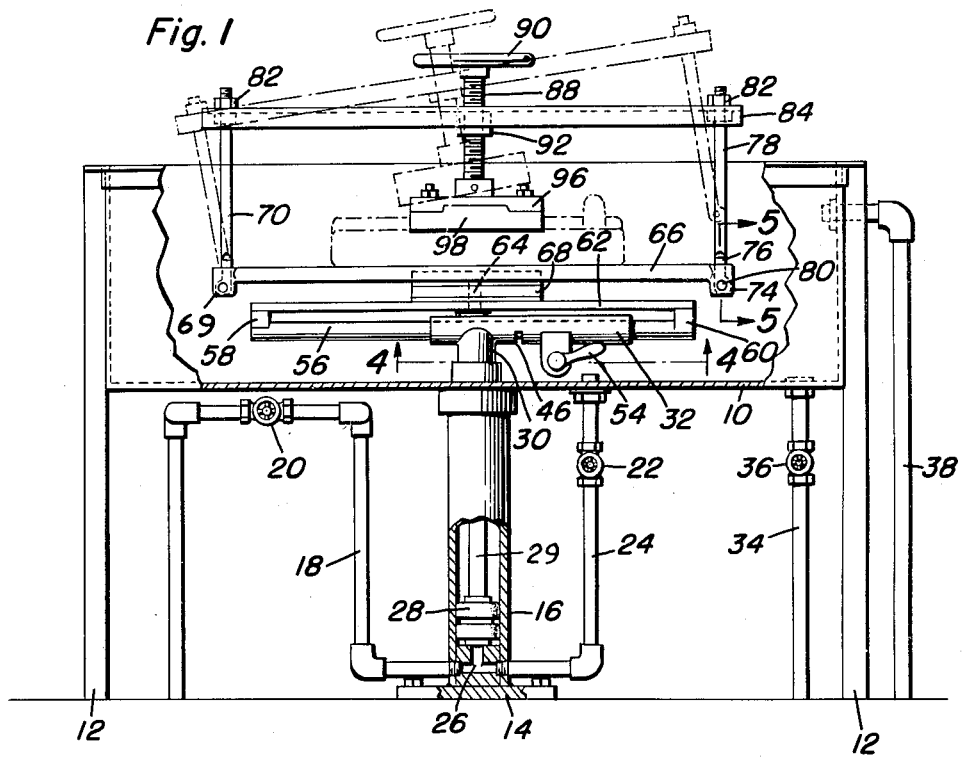
Figure 1 is a side elevational view of the device with parts being broken away to show other parts in greater detail and with some of the elements thereof being shown in section for greater clarity.
Figure 2:
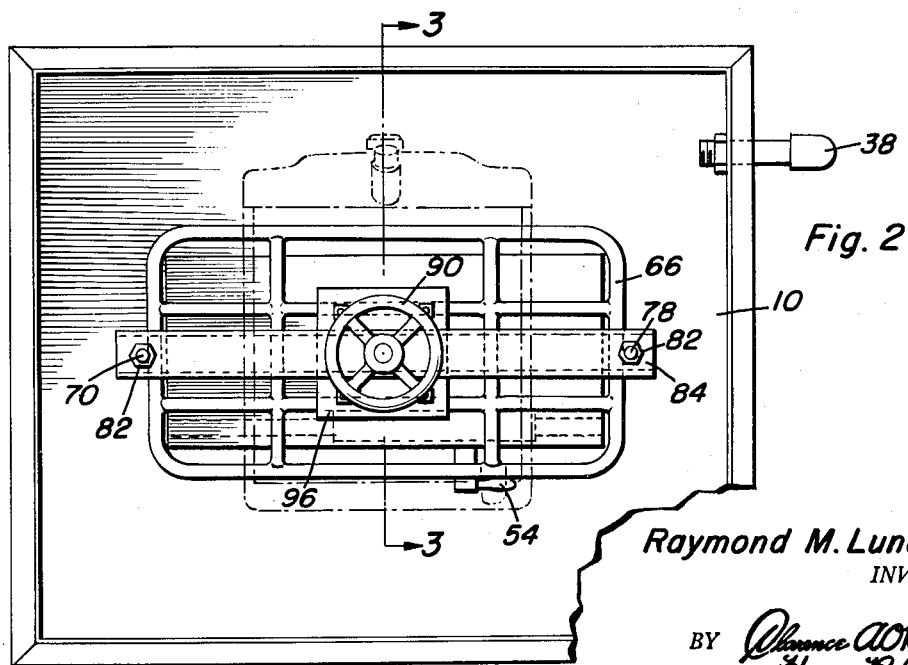
Figure 2 is a top plan view of this invention.
Figure 3:
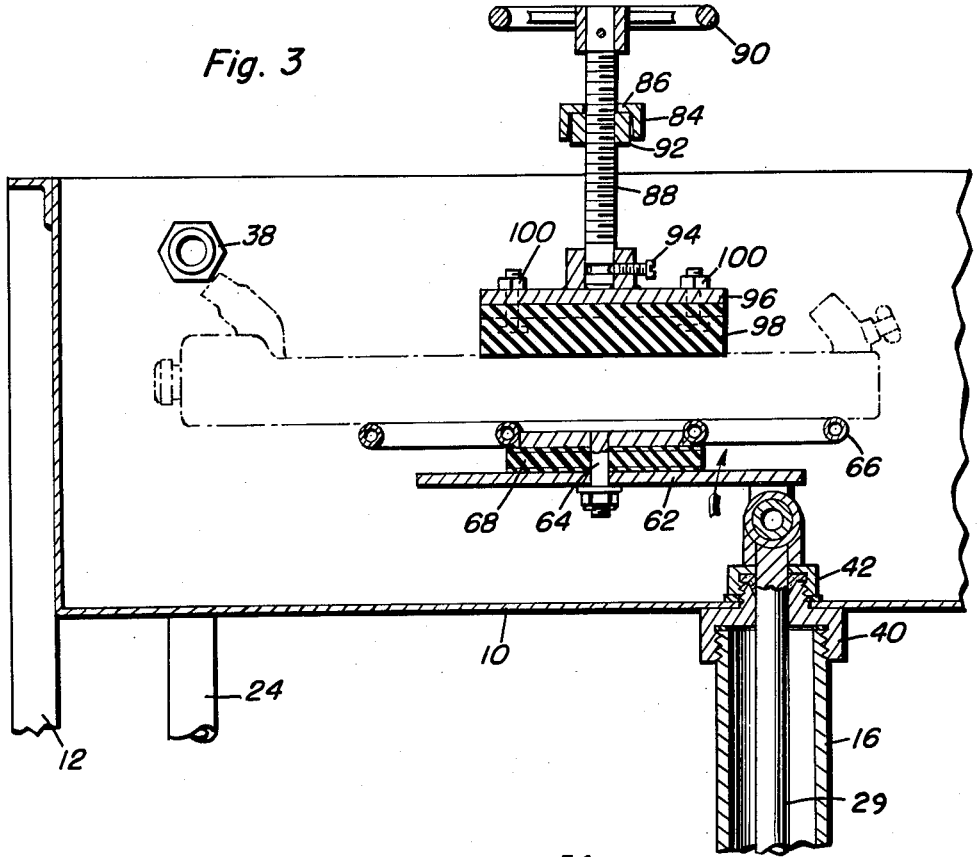
Figure 3 is a vertical sectional view as taken along the plane of line 3—3 in Figure 2.
Figure 4:
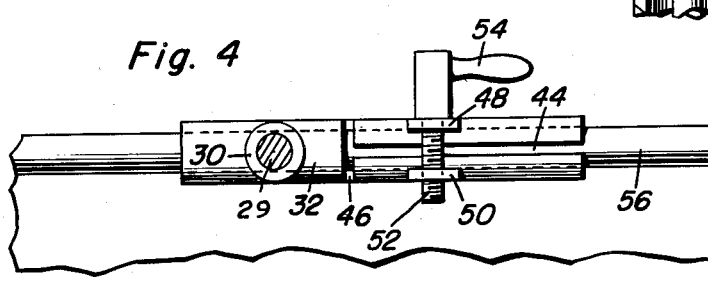
Figure 4 is an enlarged sectional detail view as taken along the plane of line 4—4 in Figure 1; and, Figure 5 is an enlarged vertical sectional detail view as taken along the plane of line 5—5 in Figure 1.
Figure 5:
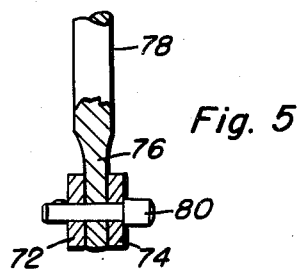

With continuing reference to the accompanying drawings wherein like reference numerals designate similar parts throughout the various views, reference numeral 10 generally designates a tank or vat which is supported by legs 12 and which is of any suitable configuration to contain within the requisite quantity of fluid in which the automotive vehicle radiator to be tested can be immersed. In addition to the legs 12 a stand 14 and a tube or cylinder 16 further supports the vat 10. Connected to the cylinder 16 is a conduit 18 and a valve 20 is provided for controlling the flow of fluid through the conduit 18 from any convenient water tap, not shown. A valve 22 is provided for controlling the flow of fluid through a conduit 24 interconnecting the tank 10 and the cylinder 16. A T-connection 26 is therefore provided at the point where the conduits 18 and 24 are connected to the tube 16. A piston 28 having a piston rod 29 is mounted in the tube or cylinder 16 and attached at upper end of the piston rod 29 is a fitting 30 which carries a supporting cylinder 32. A drain conduit 34 is provided and is attached to the tank 10 and is controlled by a valve 36. There is also provided an overflow conduit 38. The cylinder 16 is provided with external threads at its upper end and is threadedly engaged in a bushing 40 which extends through the bottom wall of the tank 10. A gland nut 42 provides a seal for the bushing 40 and cylinder 16 and the piston 28 is thus free to move vertically within the tank 10.

The cylinder 32 is provided with a longitudinally extending slot 44 in one thereof. A transverse cutter or slit 46 extends partially through the cylinder 32 and intersects the slot 44 at the inner end thereof. A pair of ears 48 and 50 depend from the cylinder 32 on opposite sides of the slot 44 and the threaded rod 52 having a handle 54 extends through an aperture in the ear 48 and is threadedly engaged with the ear 50. Hence, upon rotation of the handle 54 the cylinder 32 can be adjusted so as to clampingly embrace the rod 56 slidably rotatably positioned within the cylinder 32. The rod 56 has attached thereto end pieces 58 and 60 which support a plate 62 which carries a shaft 64 having attached thereto a supporting tray 66. Between the plate 62 and the tray 66 there is provided a resilient pad 68 of rubber impregnated fabric to provide friction when the tray 66 has clamped thereto an automotive vehicle radiator, the tray 66 being otherwise free to rotate. The tray 66 is formed from tubular material and is in the shape of a rectangle and of such size as to provide a suitable supporting surface for the automobile radiator. At one end of the tray 66 there is secured a bracket 69 within which a supporting pillar 70 is pivotally attached. A pair of spaced ears 72 and 74 are provided for reception of an apertured end 76 of another support pillar 78, the piller 78 being detachably held in position by means of pin 80. The upper ends of the supporting pillars 70 and 78 are threaded and pairs of nuts 82 are used to hold a transverse beam 84 above the tray 66. The transverse beam 84 is provided with a central aperture 86 therethrough through which a threaded clamp operating shaft 88 extends. A wheel 90 is provided for rotating the shaft 88 and a threaded block 92 is threadedly engaged with the shaft 88 and abuts against the beam 84. By means of a set screw 94 a clamping plate 96 is secured to the lower end of the shaft 88. A resilient pad 98 of rubber or other similar material is bolted as at 100 to the clamping plate 96 and is used to hold the radiator on the tray 66 while preventing scarring or marring of the radiator surfaces.

In use, the clamping elements including the beam 84 are rotated completely away from its overlying position over the tray 62 after the pin 80 has been removed. Then, opening the valve 20 will permit the pressure of the tap water to raise the tray upwardly at least flush with the upper surface of the tank or vat 10. Then, the radiator may be easily placed on the tray 66 after which the clamping elements may be swung back into place and the pin 80 replaced. At that time the wheel 90 may be rotated to clampingly hold the radiator in place on the tray 66. Then, the valve 22 may be opened allowing the fluid with the cylinder 16 to pass upwardly through the conduit 24 and into the tank 10. The vat 10 having previously been filled with fluid any extra fluid will pass out through the overflow conduit 38. Then, compressed air may be introduced through the radiator to be tested and any leaks can then be plainly observed. It is to be noted that the tray 66 may be tilted by releasing the clamping pressure of the cylinder 32 about the rod 56 and then rotating the assembly to the desired position before again actuating the handle 54 to lockingly hold the rod 56 in the selected position. Further, the entire assembly may be rotated as desired utilizing the shaft 64 as a pivot point. In adidtion, utilizing the valves 20 and 22 the radiator may be raised or lowered as may be desired. In this manner the radiator can be rotated throughout 360°, tilted from a horizontal to a vertical position in either direction and may be raised or lowered out of or into the vat 10. Thus, after testing access to the radiator may be had in any spot for repair.

Since from the foregoing, the construction and advantages of this radiator testing device are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to as desired.

What is claimed as new is as follows:

1. A radiator testing device comprising a vat, a support cylinder in said vat, means extending into said vat and connected to said support cylinder for raising and lowering said support cylinder, a rod rotatably adjustably slidably carried by said support cylinder, a plate attached to said rod, a shaft attached to said plate, a resilient pad mounted on said plate about said shaft, a tray rotatably mounted on said shaft and engaging said pad, said tray being adapted to support a radiator in said vat, a clamp and mounting means pivotally supporting said clamp on said tray for overlying the radiator and for clamping the radiator to the tray while urging said tray toward said plate to frictionally engage said pad with said plate and said tray, said mounting means including a first pillar pivotally attached to said tray, a beam carried by said first pillar, said clamp being adjustably mounted on said beam, and a second pillar secured to said beam engageable with said tray, said clamp having a pad of resilient material depending therefrom and overlying said tray.

2. A radiator testing device comprising a vat, a support cylinder in said vat, means extending into said vat and connected to said support cylinder for raising and lowering said support cylinder, a rod rotatably adjustably slidably carried by said support cylinder, said support cylinder having a longitudinally extending slot in one end thereof, a transverse cut in said support cylinder intersecting said slot, spaced clamp ears depending from said one end of said support cylinder, said clamp means engaging said ears for drawing said one end of said support cylinder about said rod, said means for raising and lowering said cylinder including a vertical tube, said vertical tube functioning to aid in supporting said vat, a piston in said tube having a piston rod attached thereto, said piston rod being connected to said support cylinder and hydraulic means for actuating said piston connected to said tube, a plate attached to said rod, a shaft attached to said plate, a resilient pad mounted on said plate about said shaft, a tray rotatably mounted on said shaft and engaging said pad, said tray being adapted to support a radiator in said vat, a clamp and mounting means pivotally supporting said clamp on said tray for overlying the radiator and for clamping the radiator to the tray while urging said tray toward said plate to frictionally engage said pad with said plate and said tray, said mounting means including a first pillar pivotally attached to said tray, a beam carried by said first pillar, said clamp being adjustably mounted on said beam, and a second pillar secured to said beam engageable with said tray, said clamp having a pad of resilient material depending therefrom and overlying said tray.

References Cited in the file of this patent

UNITED STATES PATENTS

| | | |
|---|---|---|
| 1,409,233 | Pataky | Mar. 14, 1922 |
| 1,494,990 | Brook et al. | May 20, 1924 |
| 1,595,824 | Edquist | Aug. 10, 1926 |
| 2,576,660 | Williams | Nov. 27, 1951 |
| 2,602,990 | Ferguson | July 15, 1952 |
| 2,673,059 | Lustig | Mar. 23, 1954 |
| 2,679,092 | Austin | May 25, 1954 |